July 4, 1933.  C. C. COLE  1,916,301
OIL WELL RECORDING INCLINOMETER
Filed July 12, 1929   2 Sheets-Sheet 1
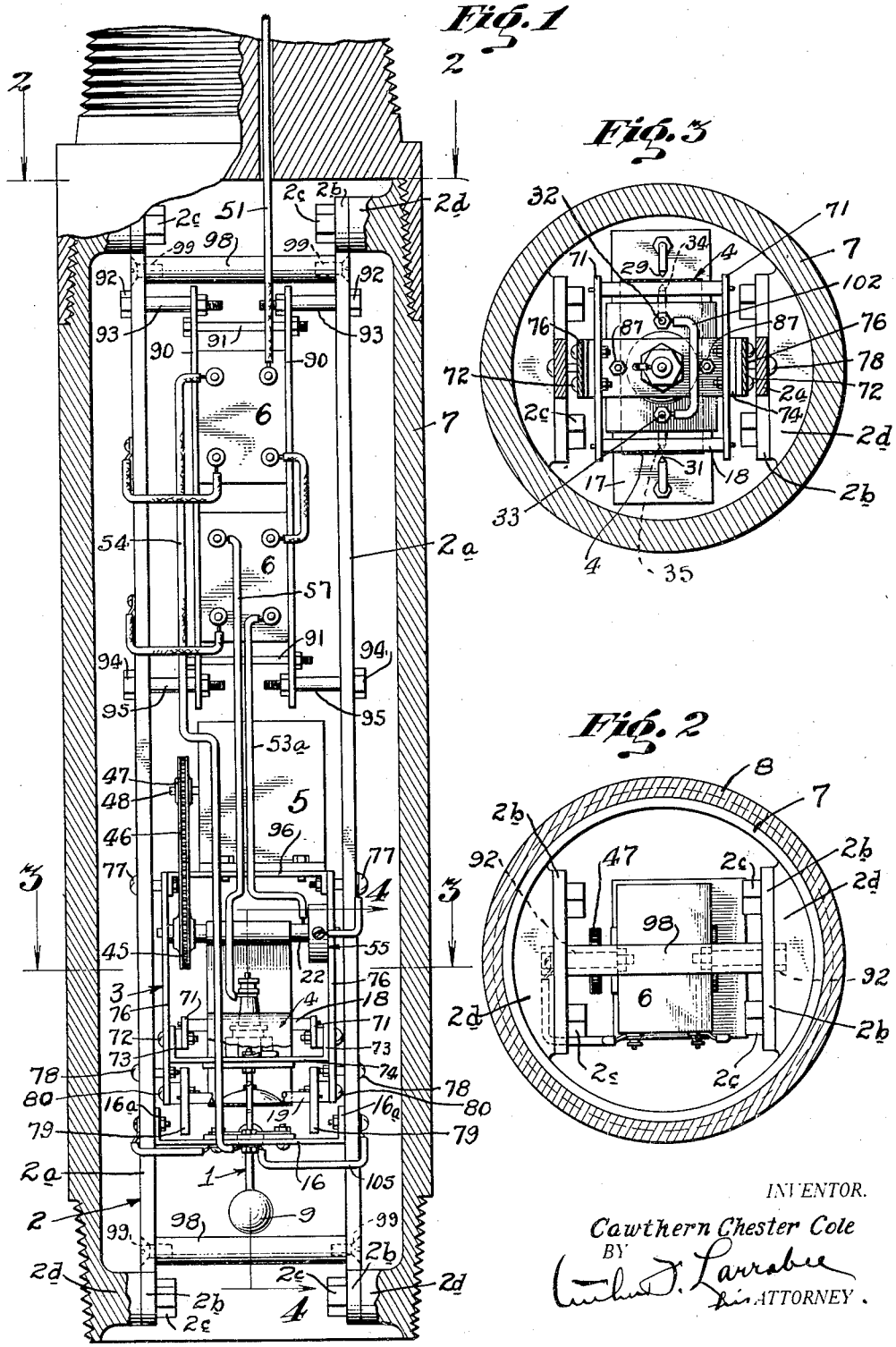
INVENTOR.
Cawthern Chester Cole
BY
ATTORNEY.

July 4, 1933.  C. C. COLE  1,916,301
OIL WELL RECORDING INCLINOMETER
Filed July 12, 1929  2 Sheets-Sheet 2
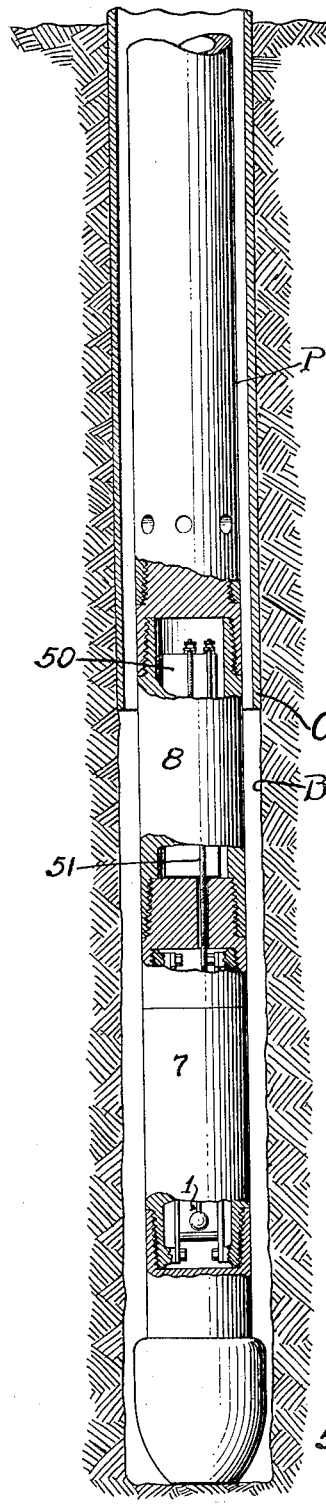
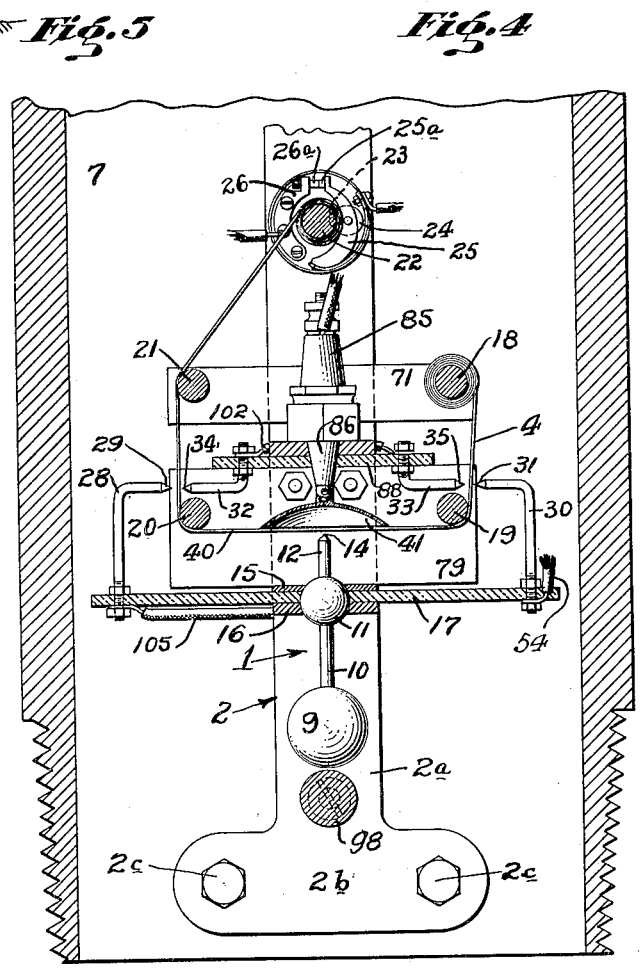
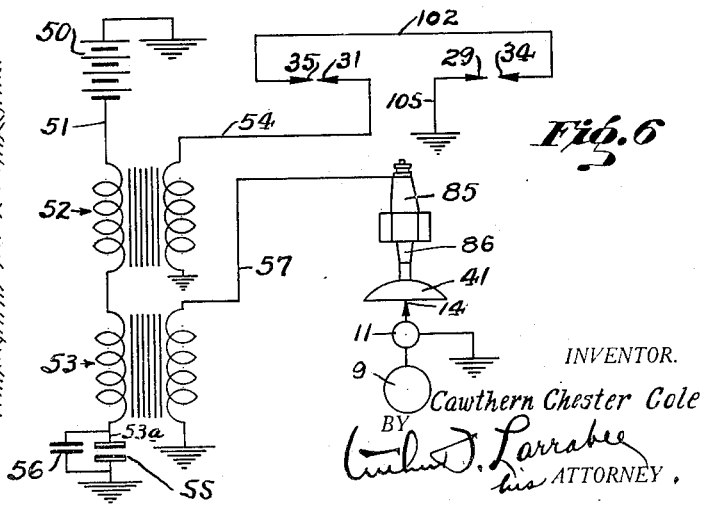
INVENTOR.
Cawthern Chester Cole
BY
his ATTORNEY.

Patented July 4, 1933

1,916,301

UNITED STATES PATENT OFFICE

CAWTHERN CHESTER COLE, OF WHITTIER, CALIFORNIA

OIL WELL RECORDING INCLINOMETER

Application filed July 12, 1929. Serial No. 377,740.

This invention relates to an apparatus for detecting the deviations from the vertical, of oil well bores, and for determining both the direction and the magnitude of the deviation and the distance from the surface of the ground at which such deviation is located.

An object of the invention is to provide detecting means of the character stated which may readily be attached to and disconnected from the tool pipe line and which may be made use of in the field by the ordinary workmen employed in drilling of wells, without any special previous training being required to enable such workmen to operate the instrument to obtain a record sheet.

Another object of the invention is to provide an improved recording means operated by the instrument whereby a record is automatically inscribed upon a sheet indicating the deviations of the well bores in a convenient form for future reference.

A further object of the invention is to provide improved time-controlled operating means for the record sheet, in combination with means for making records upon said sheet at predetermined intervals while the appliance is being lowered into the well, thus providing upon a single record sheet or strip, a series of indications which will reveal sufficient data whereby the location and the amount of each deviation from the vertical to be found along the entire length of the well bore may be computed.

The invention includes a sheet marking device which is adapted to be operated by a single suspended weight, in such a manner as to indicate a deviation from the vertical no matter at what point with respect to the circumference of the well bore such deviation may be encountered. For this purpose a pendulum is mounted upon a universal joint so that it is free to swing in all directions thus giving the proper movement to the indicating element.

Other objects, advantages, and features of invention may appear from the accompanying drawings, the subjoined detail description and the appended claims.

Referring to the accompanying drawings which illustrate the invention by way of example.

Figure 1 is a side elevation of the detecting instrument, the casing or housing wherein it is contained being for the most part shown in mid-section.

Fig. 2 is a cross section on line 2—2, Fig. 1, showing a plan view of my invention in its housing.

Fig. 3 is a cross section on line 3—3, Fig. 1.

Fig. 4 is an axial section on line 4—4, Fig. 1, on a larger scale.

Fig. 5 is a side elevation of a portion of drill pipe into which my device is fitted. Parts are broken away to illustrate the section containing the electrical batteries and to disclose the relation of my invention in the pipe. A portion of the well casing in the well is shown in section.

Fig. 6 is a diagrammatic view illustrating the wiring of the electrical elements of the instrument.

Referring in detail to the drawings, B designates the well bore and C the well casing. Important parts of the invention are a pendulum 1 suspended from a support which is made up of an external frame 2 and an internal frame 3 supported thereby, a record sheet 4, clock work 5 for operating said record sheet, step-up coils 6 together with their electrical connections, and the time-controlled and pendulum governed means for simultaneously marking the record sheet by electric sparks at three different points, these devices for marking the sheet as stated being best shown in Fig. 4, and all the working parts of the instrument being enclosed within the cylindrical casing or housing 7 which is adapted to screw into the lower end of the lowest pipe line section 8.

Referring more particularly to Fig. 4, the pendulum weight 9 is carried by the pendulum rod 10 to which is fixed the ball bearing member 11, said pendulum rod 10 having a pointed upward extension 12 which projects above said ball bearing member 11, and which is furnished with a spark point 14, the position of which is governed by the swing of pendulum 1.

Said ball bearing 11 is mounted between an upper bearing plate 15 and a lower bearing plate 16, said bearing plates being spaced apart and affording a support for a bar of insulating material 17 which is located between them. Plate 16 has an upwardly extending arm 16a at each end whereby it is bolted to the frame pieces 2a.

Above the parts which have just been described is located the record sheet 4 which is wound upon the supply reel or roller 18, is passed around the idle roller 19, 20 and 21 and thence is led up to roller 22 which is operated by the clock work 5 (see Fig. 1).

Suitable means to make and break an electrical circuit are provided and comprise the roller 22 which is provided beyond one edge of the record sheet 4, with a recess 23 with which cooperates a cam roller 24 carried by the weighted arm 25 upon which is mounted the movable contact point 25a with which cooperates the stationary adjustable contact point 26a carried by the member 26. While the clock work is rotating the roller 22, the circuit is completed for a brief interval at each rotation of said roller, by reason of the cam roller 24 dropping into the recess 23 in roller 22 and the circuit is practically immediately broken by continued rotation of the roller 22 and a sharp spark of short duration is obtained as will be more fully hereinafter set forth.

Upon one end of bar 17 is mounted a conductor 28 of an inverted L-shape, which terminates in a spark point 29 adjacent to the record strip 4 above roller 20, and upon the other end of bar 17 is mounted a corresponding conducting member 30 having a sparking point 31 adjacent to sheet 4 above roller 19.

Internal angular conductors 32 and 33 cooperate respectively with conductors 28 and 30, the conductor 32 having a sparking point 34 and the conductor 33 having a sparking point 35, the record strip 4 being led between the cooperating sparking points thus provided. By arranging the contact points 29, 34, 35 and 31 (see Fig. 4) in such a manner as to mark the vertical runs of the record sheet 4, with the markings which are provided to act as landmarks, the entire horizontal run of the sheet is left unobstructed, thus providing ample room for the pendulum controlled marking means, about to be described, which operates upon the horizontal portion of the sheet.

Between the idle rollers 19 and 20 the record strip 4 is provided with an intermediate substantially horizontal run 40 which is led across the downwardly directed open side or concavity of a concavo-convex conducting member 41 which is connected up in the electric circuit in a manner to be described later. When the pendulum rod 10 is vertical, the sparking point 14 of its extension 12 is vertically beneath the center of said concavo-convex member 41, and said sparking point 14 is at all times near enough to said member 41 to allow a spark to jump from said sparking point to said member 41, the spark marking the intervening sheet section 40 when it jumps the gap. The member 41 is in the form of a plate that has an area sufficient to cover the path through which the movable point 14 will ordinarily travel.

At one side of the record sheet 4, the roller 22 carries a sprocket wheel 45, a sprocket chain 46 passing over said sprocket wheel to rotate said roller. Said sprocket chain in turn is driven by a driving sprocket wheel 47 fixed to a shaft 48 driven by any suitable clock mechanism (not shown) that is contained within casing 5.

Referring again to the electric features, electric current is supplied from a battery 50 (see Figs. 5 and 6) preferably made up of dry cells which are contained in the tubular casing 8 which is attached to the terminal section P of the tool pipe line 8. From said casing 8 a wire 51 leads to the step-up coils 6 shown in the diagram (Fig. 6) as 52, 53. From the coil 53 a wire 53a leads to the electric make-and-break device 55 which is operatively related to the clock-driven roller 22 already referred to. A condenser 56 is placed around said device 55 in order to extinguish the arc after contact is broken.

From condenser 53 a wire 57 leads to the plug 85 from which the current flows through the contact member 41 into the contact point 14 where it is grounded. From the coil 52 wire 54 leads to the contact point 31 where it passes through the gap to the point 35, and wire 102 connects point 35 to point 34 whence it passes through the gap to point 29, from which wire 105 leads to the ground.

Referring to details of construction, the aforementioned rollers 18 and 21 are journaled in the ends of, and occupy the space between two horizontally extending plates 71 which are each secured by screw bolts 72 to one of the upright limbs 73 of a cross plate 74.

Said bolts 72 also extend through the vertical frame members 76 and thereby support the plate 74. Each of said frame members 76 is supported at its upper end from the outer frame piece 2a by a screw bolt 77, spacing sleeves being provided around these bolts in order to maintain a clearance between said frame members 76 and 2a. The lower portions of frame members 76 are likewise supported in spaced relation to frame members 2a by means of screw bolts 78.

The idle rollers 19 and 20 are supported between and by plates 79 which are secured to the frame pieces 76 by means of screw bolts 80, spacing sleeves being interposed between said plates and frame pieces.

Upon the aforementioned cross plate 74 is mounted a binding post 85 having a downward extension 86 to the lower end of which is attached the concavo-convex member 41, the center of which is normally vertically above the pendulum 1.

To the lower side of cross plate 74 is attached by means of bolts 87, a plate 88 of insulating material through which extends the vertical limbs of the angular sparking members 32 and 33 already mentioned.

The spark coils 6 are supported between vertically extending plates 90 which are clamped against opposite sides of the spark coil casings by means of bolts 91. Each of said plates 90 is suspended at its upper end from the adjacent frame piece 2a by means of a bolt 92 having therearound a spacing sleeve 93 located between said bolt and frame piece. Bolts 94 provided with spacing sleeves 95 connect the lower ends of said plates with said frame pieces 2a which are each furnished at each end with a head 2b which is secured by screw bolts 2c to a boss 2d which projects inwardly from the tubular member 7.

The clock work 5 is supported by a crossplate 96 which is supported by the inner ends of bolts 77 already mentioned.

Additional stability is given to the frame work by fitting spacing bars or sleeves 98 between the end portions of the outer frame pieces 2a and securing these spacers in place by means of screws 99 screwed into their ends.

Preparatory to lowering the device into the well, the record sheet is nearly all wound upon the supply roll 18, its free end then being led around rollers 19, 20 and 21 and attached to roller 22. The clock work contained within casing 5 is then wound up and set in motion, the operation thereof being timed to rotate roller 22 one complete revolution during the period of time required to lower the tool pipe each successive one hundred feet. With the clock work thus timed, the cam roller 24 will enter the recess 23 in the roller 22 (see Fig. 4) after each successive one hundred foot descent of the device at which times the electric circuit will be closed and opened for a brief interval thus causing electric sparks simultaneously to jump through the sheet 4 across the gap between the sparking points 29 and 34 and through said sheet across the gap between the sparking points 31 and 35. At the same time a spark will jump across the gap between the pendulum point 14 and the portion of the concavo-convex conducting element 41 toward which said point 14 happens to be directed, the position of said point 14 depending upon the position of the pendulum with respect to the vertical at such time, and the position of the pendulum, in turn, depending upon whether or not the device as a whole has been deflected from the vertical by reason of having encountered a portion of the well bore which deviates from the vertical.

The two lateral marking devices are positioned at the mid-width of the record sheet and at points which, with respect to the length of the sheet, are equi-distant from the pendulum point 14 when the pendulum is vertical. Therefore, if the pendulum is vertical at the time all the sparking devices are operated, the sparks will make three equi-distant marks all of which will be located at the mid-width of the record sheet; but if the pendulum weight 9 has moved, say toward the left as viewed in Fig. 4, then the mark made by the spark adjacent to the pendulum will be nearer to the mark made by the right hand sparking device than it will be to the mark made by the left hand sparking device. If the pendulum body 9 has moved to the right the intermediate sparking mark will be nearer the left hand than the right hand mark. If the pendulum as viewed in Fig. 4 has moved toward or from the observer, then the intermediate spark-mark will be correspondingly moved toward one of the edges of the record sheet. Likewise there may have been a movement of the pendulum which will cause a combination of these deviations so that the intermediate spark-mark will not only be found at one side or the other of the mid-width of the record sheet, but will also be found nearer to one than the other of the marks made by the outer (as distinguished from the intermediate) sparking devices. Hence it will be seen that the marks made by the outer sparking devices serve as landmarks to aid in determining the deviation of the intermediate and movable sparkmark from normal.

The clock work may be constructed and arranged to cease running by the time the device has reached the bottom of the well, or it may be allowed to continue to run during the return upward movement thereof. In the latter case a double record will be made along the record sheet. The portion of the sheet which bears the series of spark-marks may be removed from the rollers and kept for future reference.

In order to compute the inclination or angle which the well bore deviates from the vertical, a line is drawn between the marks formed by the outer sparking devices, and such line is then bi-sected at which point on said line will indicate the true position of the spark that will be formed by the intermediate sparking device when my device is in a vertical position. In the event the intermediate spark is located at any other point than the mid-point just referred to, a line is drawn from such mid-point to the point made by the intermediate sparking device, and in order to obtain the direction that the well deviates from the vertical, the angles between the line just formed and the connecting line is obtained by any suitable computation. In order to obtain the magnitude of the inclination, the line from the true mid-point on the connecting line to the point made by the intermediate spark device is measured and the distance thus obtained is sufficient to enable the mathematician to compute the magnitude of the inclination.

I claim:

1. In an apparatus for detecting deviations from the vertical in well holes, a support; means to lower said support in a normally upright position into a well; an elongated longitudinally movable record sheet carried by said support; said record sheet being adapted for longitudinal movement; a portion of the moving sheet extending in a horizontal direction, and other portions thereof extending vertically a pendulum carried by said support, said pendulum being mounted upon a universal bearing to allow it to swing in all directions; an electric sheet-marking device operatively related to said pendulum to position it to mark the horizontal portion of said sheet at points which will indicate any divergence of said normally upright support from the vertical, said support being movable to a deflected position whenever it encounters a deflected portion of the well bore, electric sheet marking means in spaced relation to said pendulum controlled marking device to cooperate therewith and positioned to mark the vertically extending portions of said sheet, and means to supply at intervals electric current simultaneously to said marking means and device.

2. In an apparatus for detecting deviations from the vertical in well bores, a support, means for lowering said support into a well in an upright position, an elongated record sheet carried by said support, rollers carried by said support to guide said sheet, said sheet having a horizontal run and a vertical run at each end of said horizontal run, a pendulum comprising a pendulum rod which projects above the point about which said pendulum oscillates and is provided at its upper end with a sparking point adjacent the lower side of said sheet, a horizontally extending conducting element stationed above said sheet adjacent to said sparking point to cooperate therewith, said conducting element being of a sufficient horizontal extent to provide conducting means opposite to said sparking point during all parts of the swing of said pendulum, a source of electric current supply, conducting means leading from said source and forming a normally open circuit which includes said sparking point and also includes said horizontally extending element, additional sparking means constructed and arranged to project a spark through said sheet at a point spaced from and above said horizontally extending element on one of said vertical runs, and circuit making means to open and close said circuit at predetermined intervals for the purpose of obtaining a series of sparks through said sheet at a plurality of predetermined points.

3. An apparatus for detecting deviations from the vertical in well bores having an elongated record sheet adapted to be moved longitudinally, a support for said sheet adapted to be lowered within a well at a uniform predetermined rate, three marking devices normally positioned to mark said sheet at three points along its mid-width, a pendulum operable in all directions by variations of said support from the vertical, said pendulum being operatively related to the central marking device of the three recited marking devices to vary its position both lengthwise and crosswise of the sheet, and means to simultaneously operate said three marking devices at predetermined intervals.

4. In an apparatus for detecting deviations from the vertical in well bores, a support, means for lowering said support into a well in a normally upright position, a record sheet carried by said support, an electric device for marking said sheet at predetermined time intervals, a pendulum operatively connected with said marking device to determine the mark made thereby with respect to the length of said sheet, and auxiliary sheet-marking means governed by said clockwork to mark said sheet simultaneously with the pendulum controlled marking device and at points spaced apart from each other with respect to the length of the sheet for the purpose of providing a landmark for the location of the marks made by the first recited marking device.

5. In a recording inclinometer, a sheet adapted to be moved past a fixed point, means for marking said sheet in spaced relation in line with its direction of movement; and means operable by the inclination of the well and adapted to mark said sheet with an electric spark intermediate the first mentioned markings.

6. In a recording inclinometer, an elongated sheet adapted to be moved lengthwise past a fixed point, two fixed points in spaced relation along said sheet, a movable point operable between said fixed points, and means whereby electric sparks are passed from said points to mark said sheet.

7. In an art of measuring the inclinations from the vertical in well bores, an elongated sheet adapted to be moved lengthwise; means for marking said sheet simultaneously at two points spaced along said sheet; and means whereby said sheet will be simultaneously marked intermediate said two points by an electric spark whereby the direction and magnitude of the inclination may be computed.

8. In an apparatus for computing the inclination of well bores comprising in combination an elongated sheet adapted to be moved lengthwise two points spaced along the longitudinal axis of said sheet, means whereby said sheet is marked by an electric spark at said points; a cross-point mounted for universal movement; and means whereby an electric spark is passed from said universal mounted point to mark said sheet between said fixed points.

9. In a recording inclinometer, having an elongated sheet adapted to be moved along its longitudinal axis, and a plurality of spark points spaced along said sheet, certain of said points being in fixed relation to each other, one of said spark points comprising a movable point, and the cooperating point of said movable point being in the form of a concavo-convex member.

10. In a recording inclinometer, having an elongated sheet adapted to be moved along its longitudinal axis, and a plurality of spark points spaced along said sheet, certain of said points being in fixed relation to each other; and one of said spark points comprising a movable point, and the co-operating point of said movable point being in the form of a plate having an area sufficient to cover the path through which the movable point will ordinarily travel.

11. In a recording inclinometer, having an elongated sheet adapted to be moved along its longitudinal axis, and a spark point comprising a movable point adapted to indicate variations in the position of the inclinometer with respect to the vertical, said spark point being at all times positioned to discharge a spark through said sheet, means to receive a spark to be discharged from said spark point to mark said sheet, and auxiliary means to simultaneously mark said sheet in another place to provide a landmark for the purpose specified.

12. In a recording inclinometer, having an elongated sheet adapted to be moved along its longitudinal axis, and a plurality of sparking devices each of which is constructed and arranged to make a spark mark upon said sheet, and time-controlled means to govern the operation of said sparking devices whereby they are caused to operate in unison at predetermined intervals and are all maintained in an inoperative condition at other times, one at least, of said marking devices serving as a landmark to aid in determining the variation of the mark made by another of said sparking devices.

13. In an apparatus for detecting deviations from the vertical in well bores, a support, means for lowering said support into a well in an upright position, an elongated record sheet carried by said support, said sheet having vertical runs the lower ends of which are connected by a horizontal run, a pendulum controlled sparking point to mark said horizontal run of said sheet, means located at each outer side of said vertical runs and between them to electrically mark them, and means to simultaneously actuate both the means for marking the horizontal run and the vertical runs of the sheet.

14. In an apparatus for detecting deviations from the vertical in well bores, a support, means for lowering said support into a well in an upright position, an elongated record sheet carried by said support, said sheet having vertical runs connected by a horizontal run, a gravity controlled sparking point to mark said horizontal run of said sheet, means located between and at the outer sides of said vertical runs to electrically mark them, and a means timed to simultaneously actuate both the means for marking the horizontal run and the vertical runs of the sheet.

In testimony whereof, I have hereunto set my hand at Los Angeles, California, this 6th day of July, 1929.

CAWTHERN CHESTER COLE.